United States Patent [19]

Kato

[11] Patent Number: 4,494,634

[45] Date of Patent: Jan. 22, 1985

[54] IMPACT DAMPER

[75] Inventor: Katuo Kato, Sagamihara, Japan

[73] Assignee: NHK Spring Co., Ltd., Yokohama, Japan

[21] Appl. No.: 336,021

[22] Filed: Dec. 30, 1981

[51] Int. Cl.$^3$ .............................................. F16F 7/10
[52] U.S. Cl. ................................ 188/380; 248/559
[58] Field of Search .................... 188/378, 379, 380; 267/136, 137, 158, 160; 248/559, 574, 575

[56] References Cited

U.S. PATENT DOCUMENTS

| 2,038,603 | 4/1936 | Roche | 188/380 |
| 2,209,140 | 7/1940 | Rybar | 188/378 |
| 2,602,350 | 7/1952 | Marcellus | 267/158 |

FOREIGN PATENT DOCUMENTS

| 429781 | 2/1948 | Italy | 267/158 |
| 771826 | 4/1957 | United Kingdom | 188/379 |
| 1026358 | 4/1966 | United Kingdom | 248/559 |

Primary Examiner—Bruce H. Stoner, Jr.
Assistant Examiner—R. R. Diefendorf
Attorney, Agent, or Firm—Frishauf, Holtz, Goodman and Woodward

[57] ABSTRACT

Disclosed is an impact damper which is attached to an object of damping forming a main vibration system having a main natural frequency and serves as an additional vibration system. The natural frequency of the additional vibration system ranges from 60% to 80% of the main natural frequency, and the space between a weight of the additional vibration system and a stop attached to the main vibration system as measured when the object of damping is not vibrating ranges from 0% to 80% of the resonance amplitude of the object of damping.

8 Claims, 6 Drawing Figures

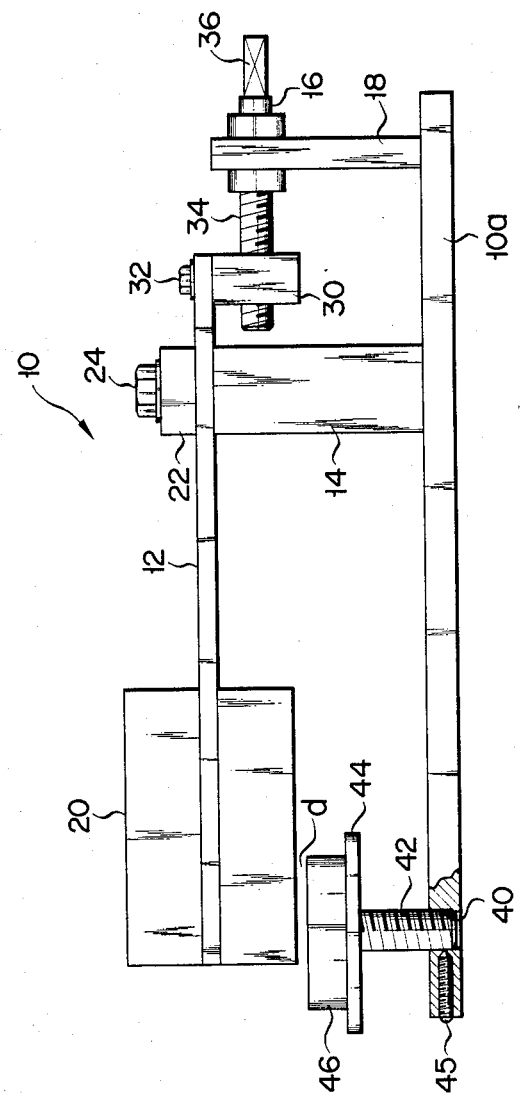

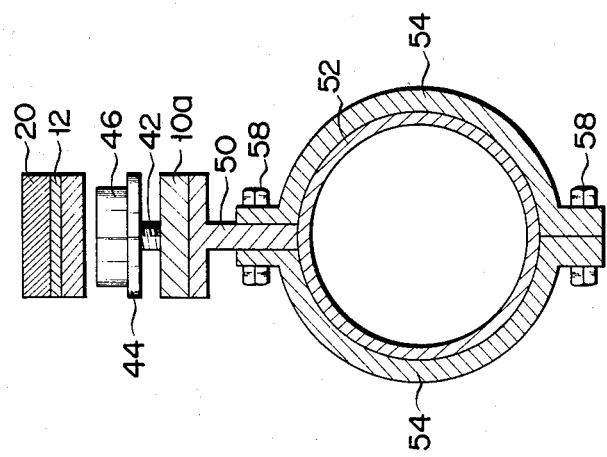
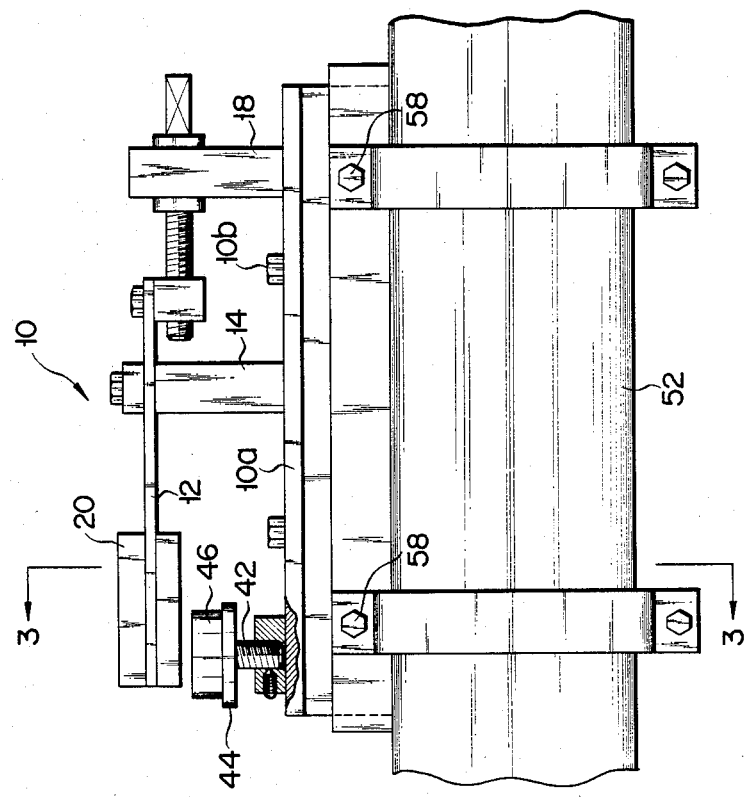

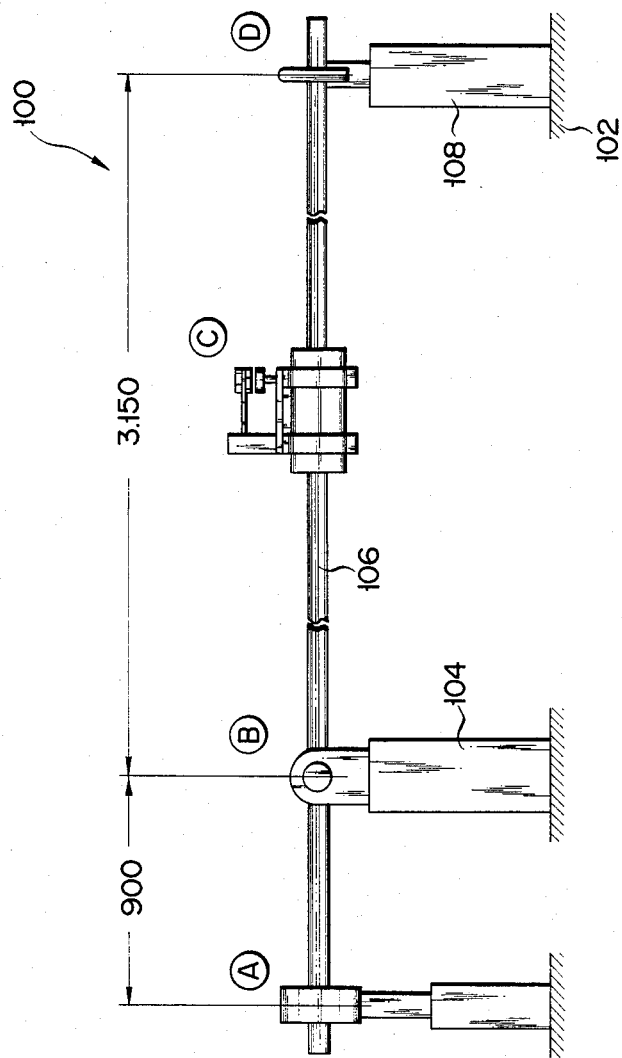

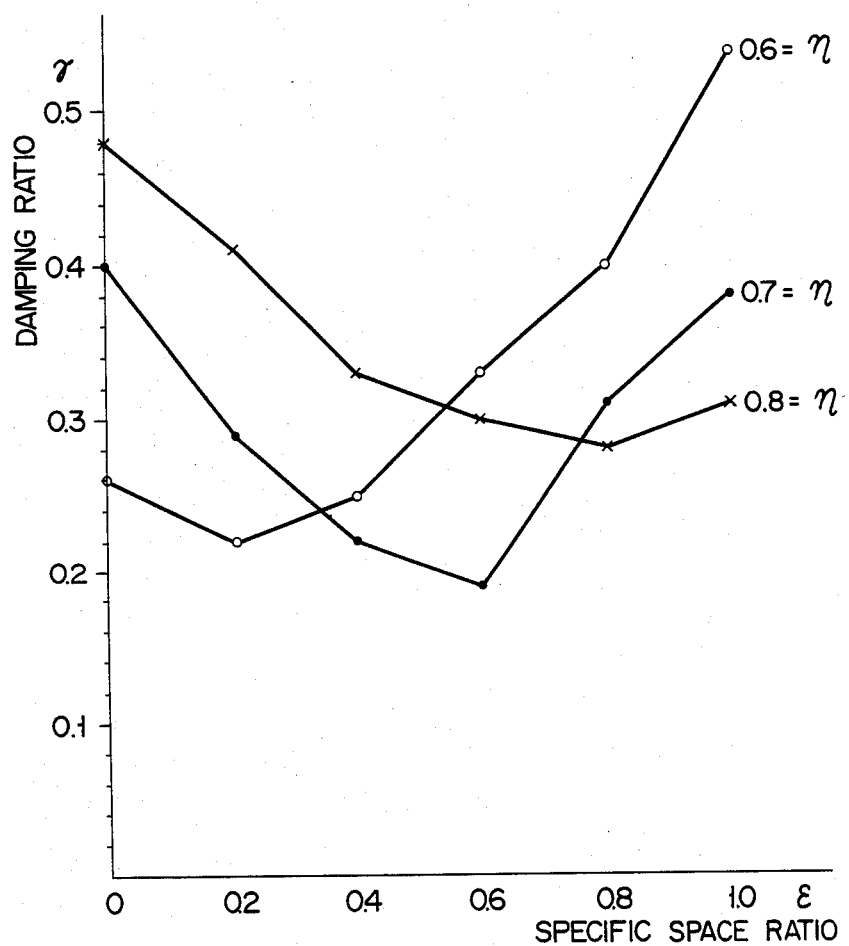

IMPACT DAMPER

BACKGROUND OF THE INVENTION

This invention relates to an impact damper comprising a bed plate attached to an object of damping forming a main vibration system with a main natural frequency, an additional weight, additional elastic means supporting the additional weight so as to be able to vibrate the same in the same direction as the vibration of the object of damping, mounting means for mounting the additional elastic means on the bed plate, and stop means mounted on the bed plate to strike against the additional weight in vibration.

From a vibrational point of view, the object of damping may be regarded as a main vibration system including a main weight and main elastic means and having the main natural frequency. Likewise, the impact damper of the invention may be regarded as an additional vibration system including the additional weight and additional elastic means and having the additional natural frequency.

The impact damper is attached to the object of damping, and vibrates in concert with the object so that the additional weight strikes against the object to damp the same with high efficiency.

In the well-known impact damper of this type, the frequency range providing a satisfactory damping effect is restricted, limiting the fields of application, unless the characteristics of the main and additional vibration systems and the relative positions of the object of damping and the additional weight are determined properly.

SUMMARY OF THE INVENTION

The object of this invention is to provide an impact damper free from the aforementioned drawbacks of the prior art impact damper and capable of producing a satisfactory damping effect throughout a wide frequency range.

To this end, an impact damper according to this invention is so constructed that the natural frequencies and relative positions of the main and additional vibration systems fulfill the following two requirements:

(1) The distance between the additional weight and the stop means as measured when the object of damping and the additional weight are not vibrating is to range from 0% (in this case the additional weight is in contact with the object) to 80% of the resonance amplitude of the object without impact damper.

(2) The additional natural frequency of the additional vibration system is to range from 60% to 80% of the main natural frequency of the main vibration system.

When the impact damper of the above-mentioned construction is attached to the object of damping, the object and the additional weight strike against each other during vibration, so that the amplitude of the object is attenuated by a change of momentum thereof and an energy loss caused by the impact. With the aforesaid construction, moreover, the object of damping can effectively be damped and prohibited from vibrating with a great amplitude in a wide frequency range including frequencies higher or lower than the main natural frequency, not to mention the main natural frequency.

The requirements of the impact damper are deduced from many tests conducted with regard to a lot of parameters other than those referred to above. Effects obtained with use of this impact damper will be mentioned later in conjunction with the preferred embodiment of the invention.

BRIEF DESCRIPTION OF THE DRAWINGS

FIG. 1 is a side view of an impact damper according to this invention;

FIG. 2 is a side view of the impact damper of FIG. 1 attached to a pipe to be damped;

FIG. 3 is a sectional view taken along line 3—3 of FIG. 2;

FIG. 4 shows a testing device for the impact damper;

FIG. 6 is a graph showing the relationship between the space ratio $\epsilon$ and damping ratio $\gamma$ obtained with use of various values of the ratio $\eta$.

DETAILED DESCRIPTION OF THE PREFERRED EMBODIMENT

Figure 5:
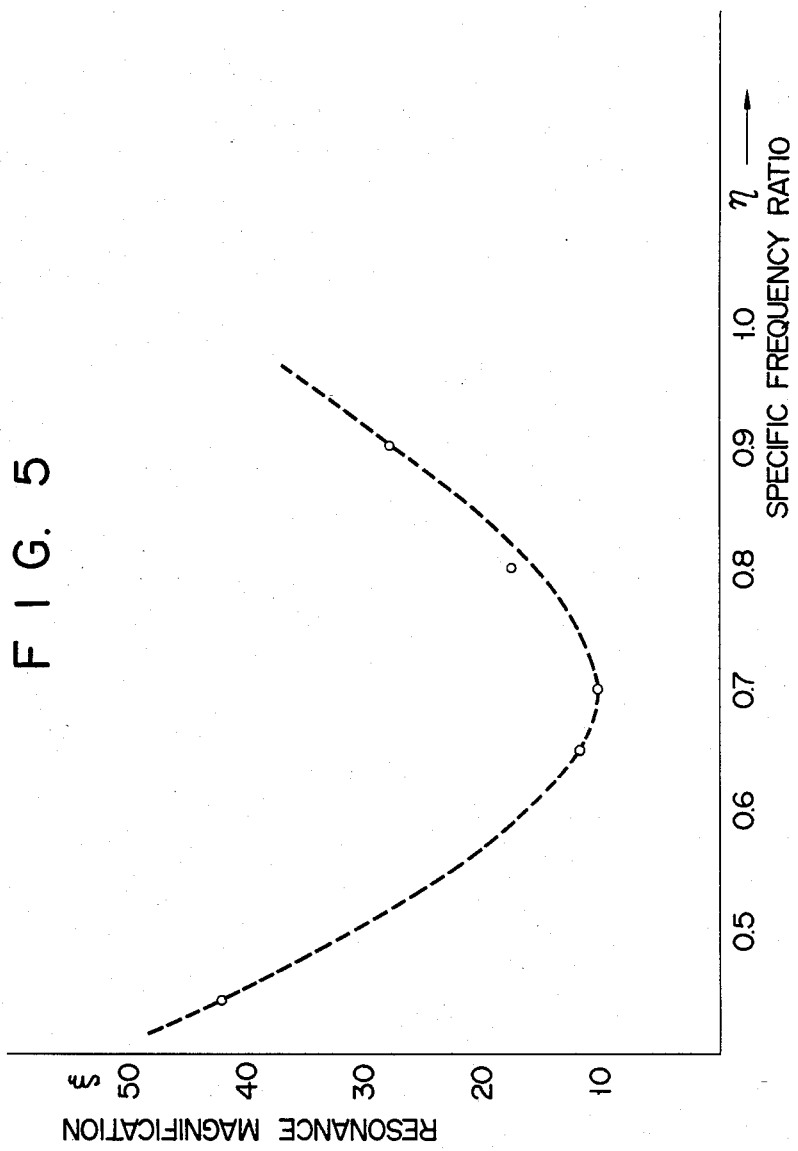
FIG. 5 is a graph showing the relationship between the resonance magnification $\xi$ and the specific frequency ratio $\eta$ between the additional vibration system natural frequency and main vibration system natural frequency.

FIG. 1 shows an impact damper 10 according to an embodiment of this invention. In FIG. 1, a bed plate 10a is mounted with a retaining stand 14 retaining an additional elastic means or an additional spring 12, and a screw retaining stand 18 rotatably supporting a screw rod 16. The additional spring 12 is a leaf spring which extends in the horizontal direction of FIG. 1, and has an additional weight 20 fixed on the left end portion thereof. The right end portion of the additional spring 12 is fixed between the retaining stand 14 and a retaining member 22 by means of a clamp screw 24 so as to be adjustable for the location of the weight 20 in a desired horizontal position. The retaining member 22, the retaining stand 14, and the clamp screw 24 form a mounting means for mounting the weight 20 and the spring 12. A nut 30 is attached tight by means of a screw 32 to the right end portion of the spring 12 which is projected to the right side of the mounting means. A threaded portion 34 of the screw rod 16 is screwed in the nut 30. The screw rod 16 is rotatably held by the screw retaining stand 18 so as not to move horizontally, and can easily be rotated by means of a square portion 36 protruding from the right end of the screw rod 16. The effective length of the spring 12 can be varied by loosening the clamp screw 24 and rotating the square portion 36 by means of a suitable tool. A tapped hole 40 is vertically bored through the left end portion of the bed plate 10a, and a stop 46 is fixed on a base 44 on the top of a screw 42 which is fitted in the tapped hole 40. The stop 46, the base 44, and the screw 42 form a stop member. The vertical position of the stop 46 is set by rotating the screw 42 and fixed by means of a setscrew 45 so that the weight 20 attached to the tip of the spring 12 can strike against the stop 46 with proper strength when it moves downward by vibration. The space between the under surface of the weight 20 and the top surface of the stop 46 as measured when the weight 20 is not vibrating is designated by d in FIG. 1.

Now there will be described the operation of the impact damper. FIG. 2 shows how the impact damper 10 is attached to a pipe 52 as an object of damping. For the simplicity of illustration, the pipe 52 is drawn in an unduly reduced scale as compared with the impact damper 10. FIG. 3 is a side sectional view corresponding to FIG. 2. Since the impact damper 10 of FIG. 2 is substantially the same as the one shown in FIG. 1, reference numerals are used to designate the principal members or portions only. The bed plate 10a of the impact damper 10 is mounted on an upwardly extending mounting member 50 with a T-shaped section by means of fitting screws 10b. The mounting member 50 is attached to the pipe 52 by means of fitting members 58 which each consists of a pair of substantially semicircular curved members 54 embracing the pipe 52 and bolts and nuts. A multitude of the impact dampers 10 of the invention are attached to the pipe 52 at suitable intervals so as to damp and prevent the pipe from vibrating substantially when an external vibration or shock such as an earthquake shock is applied to the plant, thereby protecting the pipe from damage. For example, the pipe may be one of those pipes which are used in piping systems in plants. In this embodiment, the additional natural frequency of an additional vibration system representing the vibrational characteristic of the impact damper is limited from 60% to 80% of the main natural frequency of a main vibration system representing the vibrational characteristic of the pipe 52 as the object of damping, and the space d between the additional weight 20 and the stop 46 as measured when the weight 20 is not vibrating is limited to 80% or less of the resonance amplitude D of the pipe 52 in vibration without impact damping. The ratio $\epsilon$ of the space d to the resonance amplitude D, i.e., $d/D=\epsilon$, is referred to as a specific space. Thus, the space d may be zero.

Now there will be described results of a test on damping effect conducted with use of the impact damper. FIG. 4 shows a testing device 100, in which a pipe 106 is rotatably mounted at point B on a support 104 standing on a floor 102, the pipe 106 is vertically vibrated at the left end or point A with an amplitude of ±0.25 mm, the impact damper of the invention is attached to point C where the amplitude of the pipe 106 is measured on the pipe 106, and the right end of the pipe 106 is supported at point D (where the amplitude of the pipe 102 is measured) on a stand 108 by means of a U-bolt. The pipe 106 has a diameter of 48.6$\phi$ and a natural frequency of 8.1 Hz, and is subjected to a weight of 32 kg. In this case, the resonance amplitude obtained is 4.8 mm.

FIG. 5 is a graph prepared by plotting the change of the resonance magnification $\xi$ obtained as the ratio $\eta$ between the additional natural frequency of the impact damper and the main natural frequency of the object of damping is changed and where the space d between the additional load 20 and the stop 46 is 0.8 mm. The resonance magnification is defined as the ratio of the amplitude of the actual vibration of the object of damping to the amplitude of the vibration applied to the object of damping. As may be seen from FIG. 5, the resonance magnification $\xi$ is minimized at a point where $\eta$ is approximately 0.7, and takes relatively low values elsewhere. It was confirmed that substantially the same result may be obtained where the space d is approximately 0.8 mm or less.

Thereupon, the damping ratio $\gamma$ was measured for three values of $\eta$, 0.6, 0.7 and 0.8, as compared with the specific space $\epsilon$ varying from 0 to 0.8. Here the damping ratio $\gamma$ is defined as the ratio of the amplitude of the pipe obtained with use of the impact damper to the ampitude obtained without the use of the impact damper. FIG. 6 shows curves corresponding to the three values of $\eta$. The axes of abscissa and ordinate represent $\epsilon$ and $\gamma$, respectively. Although the measurement was made for more varied values of $\epsilon$, the plotted spots are thinned out for the simplicity of illustration. If we have $\eta=0.6$ to 0.8 and $\epsilon=0$ to 0.8, $\gamma$ is reduced to approximately 0.5 or less.

As may be seen from the aforesaid test results, it is resonable to set $\eta$ within a range 0.6 to 0.8 and $\epsilon$ within a range 0 to 0.8. Namely, according to this invention, a substantial damping effect may be obtained for a wide range of the frequency $\eta$, 0.6 to 0.8, with use of $\epsilon$ ranging from 0 to 0.8.

In the damping effect test, the mass ratio $\mu$ of the additional weight to the pipe is 0.027. In testing, various values are used for $\mu$, and substantially the same damping effect may be obtained with use of the values of $\eta$ and $\epsilon$ within the aforementioned ranges.

What is claimed is:

1. An impact damper comprising:
   a bed plate attached to an object of damping forming a main vibration system with a main natural frequency;
   an additional weight;
   additional elastic means supporting said additional weight to permit said weight to be vibrated in the same direction as the vibration of said object of damping;
   said additional weight and said additional elastic means comprising an additional vibration system having a natural frequency of vibration different from that of said main vibration system;
   mounting means for mounting said additional elastic means on said bed plate; and
   stop means mounted on said bed plate and having one side face against which said additional weight strikes when said additional weight vibrates with an amplitude exceeding a given level,
   the space between said additional weight and said stop means as measured when said object of damping is not vibrating ranging from 0% to 80% of the resonance amplitude of said object of damping, and the additional natural frequency of said additional vibration system ranging from 60% to 80% of the main natural frequency of said main vibration system.

2. An impact damper according to claim 1, wherein said stop means includes a screw driven in said bed plate and a stop mounted on the top of said screw.

3. An impact damper comprising
   a bed plate attached to an object of damping forming a main vibration system with a main natural frequency;
   an additional weight;
   additional elastic means supporting said additional weight to permit said weight to be vibrated in the same direction as the vibration of said object of damping;
   said additional weight and said additional elastic means comprising an additional vibration system having a natural frequency of vibration different from that of said main vibration system;
   mounting means for mounting said additional elastic means on said bed plate, said mounting means including:
   a retaining stand erected on said bed plate,
   a retaining member holding said elastic means between said retaining member and said retaining stand, and a clamp screw for fixing said retaining member to said retaining stand, the position in which said elastic means is held being changeable by loosening and then tightening said clamp screw; and stop means mounted on said bed plate and having one side face against which said additional weight strikes when said additional weight vibrates with an amplitude exceeding a given level, the space between said additional weight and said stop means, as measured when said object of damping is not vibrating, ranging from 0% to 80% of the resonance amplitude of said object of damping, and the additional natural frequency of said additional vibration system ranging from 60% to 80% of the main natural frequency of said main vibration system.

4. An impact damper according to claim 3, further comprising means connected to said bed plate and to an end portion of said elastic means remote from said additional weight for adjusting, while said clamp screw is loosened, the portion of the total length of said elastic means which is disposed between said mounting means and said additional weight.

5. An impact damper according to claim 4, wherein said means for adjusting comprises a screw rod whose rotation varies the distance between said end of said elastic means and said retaining stand.

6. An impact damper according to claim 3, wherein said mounting means includes means for mounting said additional elastic means on said bed plate with said additional elastic means being substantially parallel to said bed plate.

7. An impact damper comprising a bed plate attached to an object of damping forming a main vibration system with a main natural frequency;

an additional weight;

additional elastic means supporting said additional weight to permit said weight to be vibrated in the same direction as the vibration of said object of damping;

said additional weight and said additional elastic means comprising an additional vibration system having a natural frequency of vibration different from that of said main vibration system;

mounting means for mounting said additional elastic means on said bed plate, said mounting means including means for mounting said additional elastic means on said bed plate with said additional elastic means being substantially parallel to said bed plate; and stop means mounted on said bed plate and having one side face against which said additional weight strikes when said additional weight vibrates with an amplitude exceeding a given level, the space between said additional weight and said stop means, as measured when said object of damping is not vibrating, ranging from 0% to 80% of the resonance amplitude of said object of damping, and the additional natural frequency of said additional vibration system ranging from 60% to 80% of the main natural frequency of said main vibration system.

8. An impact damper comprising a bed plate attached to an object of damping forming a main vibration system with a main natural frequency;

an additional weight;

additional elastic means supporting said additional weight to permit said weight to be vibrated in the same direction as the vibration of said object of damping;

said additional weight and said additional elastic means comprising an additional vibration system having a natural frequency of vibration different from that of said main vibration system;

mounting means for mounting said additional elastic means on said bed plate, said mounting means comprising means for adjustably mounting said additional elastic means on said bed plate, so that the distance between said mounting means and said additional weight is adjustable, to thereby adjust the natural frequency of vibration of said additional vibration system; and stop means mounted on said bed plate and having one side face against which said additional weight strikes when said additional weight vibrates with an amplitude exceeding a given level, the space between said additional weight and said stop means, as measured when said object of damping is not vibrating, ranging from 0% to 80% of the resonance amplitude of said object of damping, and the additional natural frequency of said additional vibration system ranging from 60% to 80% of the main natural frequency of said main vibration system.

* * * * *